Dec. 19 1922. 1,439,410
J. H. GRAY,
REFRACTORY MATERIAL AND FURNACE WALL BUILT THEREOF.
FILED JUNE 14, 1921.
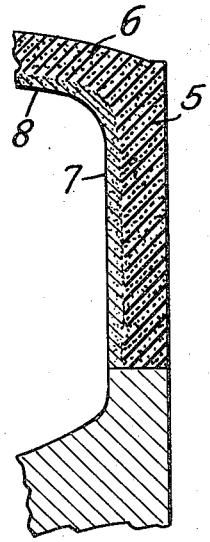
FIG. 5.
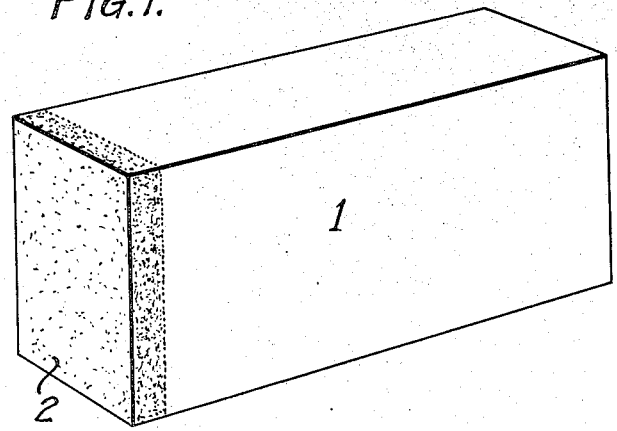
FIG. 1.
FIG. 2.
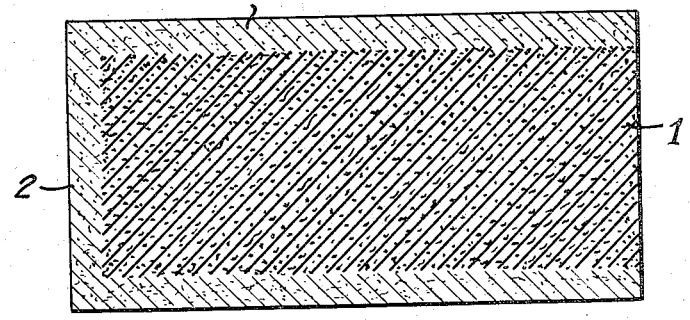
FIG. 4. FIG. 3.
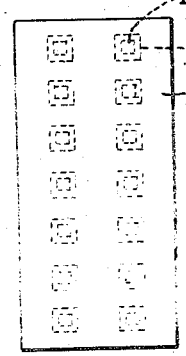
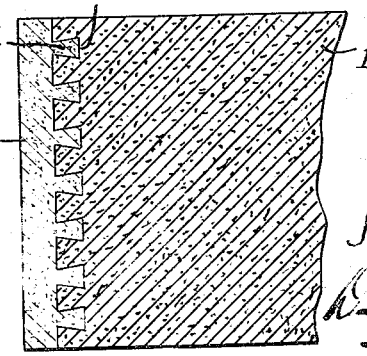
INVENTOR
James H. Gray
BY
ATTORNEY Patented Dec. 19, 1922.

1,439,410

UNITED STATES PATENT OFFICE.

JAMES H. GRAY, OF NEW YORK, N. Y.

REFRACTORY MATERIAL AND FURNACE WALL BUILT THEREOF.

Application filed June 14, 1921. Serial No. 477,413.

*To all whom it may concern:*

Be it known that I, JAMES H. GRAY, a citizen of the United States, residing in the city, county, and State of New York, have invented certain new and useful Improvements in Refractory Materials and Furnace Walls Built Thereof, of which the following is a specification.

The invention relates to the material of walls for open-hearth and other furnaces and provides a compound structure of the bricks from which such wall is built or of the wall itself. Carbonaceous material, in the form of amorphous carbon or graphite, is an extremely refractory material and has comparatively high heat conductivity, but is more readily oxidizable than other refractories so that it is at a disadvantage in open-hearth and similar furnaces in which the atmosphere is an oxidizing one. In such furnaces it is customary to build the walls of bricks made of silica, magnesia or chrome ore. There are other less common refractories, such as zirconia, which are similarly adapted for use under such conditions. These materials, however, are less refractory than carbonaceous materials. The walls of such furnaces gradually melt and wear away on the inner surface until the thickness of the walls (in which term I include the roof also) has been reduced to a point where the cooling effect of the atmosphere, or other cooling medium on the outside becomes effective to balance the heat on the inside and prevent further melting away of the inner face of the wall. The thickness to which the wall is reduced in this way depends on the conductivity of the material. A wall of more conductive material will therefore retain a greater thickness than one of less conductive material.

I propose to build the walls and roof of such a furnace of a composite structure, the outer portion, and preferably the greater portion of the thickness, being of carbonaceous material and the inner exposed portion being of a comparatively thin layer of one of the other refractories having a higher resistance to oxidation. The carbon is thus protected from oxidation and the exposed layer of refractory material will have its life prolonged and will maintain a great thickness because of the rapid conduction of the heat away from it by the carbon. The carbon and the other refractory material are made to adhere to each other in any one of various ways as hereinafter described.

The accompanying drawigns illustrate examples of my invention.

Fig. 1 is a perspective view of a brick made according to this invention;

Fig. 2 is a longitudinal section of another type of brick;

Fig. 3 is a longitudinal section of a third type;

Fig. 4 is an end view of the latter;

Fig. 5 is a section through a part of an open-hearth furnace.

The composition brick of my invention may have the protective layer of silica, magnesia or similar refractory material placed on one side or on one end only, or on all sides, or in fact on any combination of sides and ends, but preferably the side or end distant from the flame is left exposed so that heat may be radiated from it. Where the heat in the furnace is so intense that the brick or carbonaceous material becomes red hot on its outer surface, the carbon may be protected on such outer surface from a too rapid circulation of air by various known or suitable means.

Referring to the embodiments of the invention illustrated, Fig. 1 shows a brick, the body or main portion 1 of which is of carbonaceous material and the end portion 2 of which is made of any usual or suitable refractory material having a high resistance to oxidation.

In Fig. 2 the carbon body 1 is surrounded on the ends and sides with a layer 2 of the other refractory.

Bricks like Figs. 1 and 2 may be made by first forming and baking a carbon brick and then placing on the faces of it which are to be exposed a plastic layer of the other refractory and again baking the whole at a high temperature. Or such bricks may be made by first forming them of the two materials while they are in a plastic adherent condition, and then baking the composite brick. In the baking operations a method should be used similar to that of baking the electrodes of electrode furnaces; that is, the brick should be enclosed in capsules or between proper partitions in a furnace, surrounded by such materials as sand or broken carbon, which will protect them from the oxidizing effects of the baking furnace.

The planes of union between the carbon and the other refractory material may be roughened to assist in causing the materials to adhere to each other. Or, as in Figs. 3 and 4, the carbon body 1 may be provided with recesses 3 therein which are undercut to form a dove-tailed joint with tongues 4 of the protective material which is applied thereto in plastic condition.

The bricks illustrated may be of various sizes and proportions. Taking a standard nine inch brick as an example I would make eight and a quarter inches of its length of carbon and a coating of the protective refractory from one-half to three-quarters of an inch in thickness.

The carbonaceous material may be in the form commonly used for the electrodes for electric furnaces; that is, it may be composed of a carbon base such as calcined anthracite coal bound together with pitch and tar and compressed and finally baked at a high temperature, the pitch and tar becoming coked and holding the mass together in a very solid form.

Or the carbonaceous portion of the brick may be composed of graphite in a form which is also used for electrodes. When using graphite it is preferable to make the graphite portion of the brick first and to add the coating of other material and bake it on in a subsequent operation, as many of the refractory materials would be volatilized by the high temperature of the electric furnace in which graphite is made.

Instead of building the wall of bricks such as have been described it may be built up of the desired material in plastic condition. Or it may be built up partially of brick and partially of plastic material. For example, in Fig. 5, the side wall of the furnace and the roof are built up with an outer layer 5 and 6 respectively of carbonaceous material rammed in place in suitable molds and then the inner face of this carbon wall is lined with the protective refractory material, 7 and 8. This may be applied by means of a cement gun which forces the wet material against the carbon backing with great force and causes it to adhere firmly and in a uniform layer to any desired thickness. Any of the usual refractories can be applied in this way, such as silica or a mixture of silica with clay, or magnesia, chrome ore, zirconia or any mixture of these. This inner protective layer may be three-fourths of an inch thick for example, and may be specially burnt into place or will be burnt properly by the normal heating of the furnace.

Or the body of the wall and of the roof may be built of carbon bricks or blocks of suitable size and the protective coating applied in plastic condition to their inner ends. Similarly the carbonaceous material may be set in plastic condition and the protective lining applied thereto in the form of bricks, tiles or suitable blocks cemented to the inner faces of the carbon. Or the wall may be built up of carbon bricks first, and the protective lining applied thereto in the form of bricks, tiles or blocks. There is in fact a great variety of ways in which the invention may be applied in a furnace wall or roof in the selected parts thereof, but I prefer to make up the bricks first in the manner above described, of carbon and the protected refractory, and to form the wall directly of these composite bricks.

Though I have described with great particularity of detail certain embodiments of my invention yet it is not to be understood therefrom that the invention is restricted to the particular embodiments disclosed. Various modifications thereof in detail and in the arrangement of the parts may be made by those skilled in the art without departure from the invention as defined in the following claims.

What I claim is—

1. A furnace wall comprising a body of carbonaceous material and an inside exposed facing of another refractory material which has a higher resistance to oxidation.

2. A furnace wall comprising a body of carbonaceous material and an inside exposed facing of another material which, though less refractory than the carbonaceous material, has a higher resistance to oxidation.

3. An open-hearth furnace having a wall comprising a body of carbonaceous material and an inside exposed facing of another refractory material which has a higher resistance to oxidation.

4. A furnace wall composed of bricks each comprising a body of carbonaceous material and an inside exposed face of another refractory material which has a higher resistance to oxidation.

5. A furnace wall composed of bricks each comprising a body of carbonaceous material and an inside exposed face of another refractory material which has a higher resistance to oxidation, the outer exposed faces of said bricks being of such carbonaceous material.

6. A brick for building furnaces comprising a body of carbonaceous material and a face of another refractory material which has a higher resistance to oxidation.

In witness whereof, I have hereunto signed my name.

JAMES H. GRAY.